Jan. 15, 1924.
L. W. CHUBB
1,480,665
PHASE CONVERTING SYSTEM
Original Filed March 13, 1918
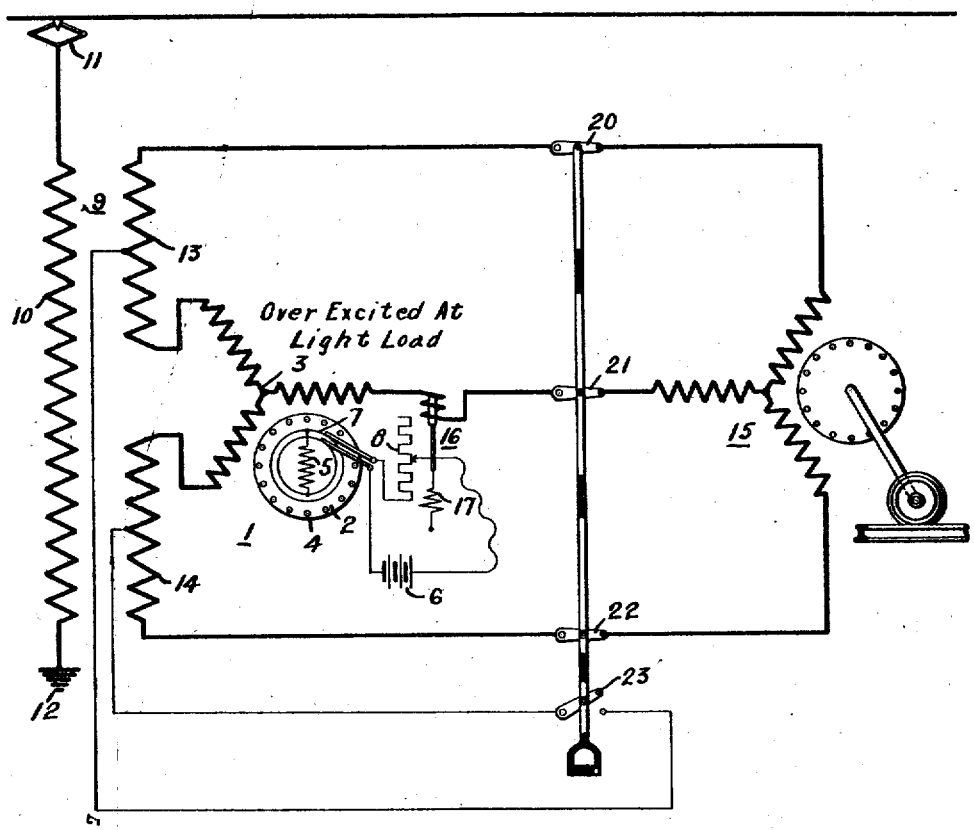
WITNESSES:
Ed. V. Herron
D.C. Davis
INVENTOR
Lewis Warrington Chubb
BY
Wesley G. Carr
ATTORNEY Patented Jan. 15, 1924.

1,480,665

UNITED STATES PATENT OFFICE.

LEWIS WARRINGTON CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

PHASE-CONVERTING SYSTEM.

Application filed March 13, 1918, Serial No. 564,220. Renewed May 27, 1922.

*To all whom it may concern:*

Be it known that I, LEWIS WARRINGTON CHUBB, a citizen of the United States, and a resident of Pittsburgh, in the county of Allegheny and State of Pennsylvania, have invented a new and useful Improvement in Phase-Converting Systems, of which the following is a specification.

My invention relates to phase-converting systems, and it has for its object to provide apparatus of the character specified wherewith power-factor correction may be effected at certain load stages and power balancing at other load stages, together with the method of operating the apparatus designated.

The single figure of the accompanying drawing is a diagrammatic view of a phase-converter of the rotating type, together with suitable supply and load currents, illustrating a preferred form of my invention.

In my copending application, Serial No. 206,921, filed Dec. 13, 1917, is disclosed and described a modification of the system described and claimed in the copending application of Chas. LeG. Fortescue, Serial No. 206,932, filed Dec. 13, 1917, and assigned to the Westinghouse Electric & Manufacturing Company. In the Fortescue application, means are shown for reversing the phase sequence of the output electromotive forces of a converter in order that their phase sequence may be the same as that of the drops, to obtain balanced electromotive forces. This effect is produced by using a non-interconnected converter and by inserting the respective windings in series circuit between the terminals of the supply winding and the load.

In my aforementioned application, a similar result is obtained with the use of an interconnected converter, the supply winding being subdivided and portions thereof being inserted between phase windings of the converter and the load in order to secure the desired reversal of phase sequence.

With either of the systems thus described, it is desirable to employ converters of the synchronous type, in order that the balance, during full-load operation, may be maintained at or near unity power factor, thus reducing to a minimum, the currents flowing in the converter windings and the heating effects. It is desirable, however, that power-factor correction be obtained during light-load operation and this effect may be readily secured by over-exciting the converter, at the expense of a slight loss of balance and of certain heating effects caused by wattless currents circulating in the converter windings.

By the provision of a suitable automatic-control device, I may cause a converter to have such field excitation during full-load operation as to provide for unity power-factor therein and, further, to over-excite said converter during light-load operation for power-factor improvement of the system as a whole.

Referring to the drawing for a more detailed understanding of my invention, I show a converter of the synchronous type at 1, said converter comprising a rotor member 2 and a stator member 3. The rotor member 2 is provided with the ordinary squirrel-cage winding 4 and with a winding 5 connected to be excited from a source of direct current 6 through suitable slip rings 7 and an adjustable resistor 8.

Energy for the operation of the converter 1 is derived from a transformer 9 having its primary winding 10 connected between a trolley 11 and a ground 12 and having its secondary winding subdivided into two portions 13 and 14. As shown, the supply winding 13 is connected to a portion of the stator winding of the converter 1 corresponding to one phase through the corresponding portion of the stator winding of a polyphase propulsion motor 15 of the induction type. In like manner, the section 14 of the supply transformer winding is connected to a portion of the stator winding of the converter 1 corresponding to another phase through the corresponding portion of the stator winding of the motor 15, the effect of this specific connection being to supply balanced electromotive forces to the motor 15, at the proper field strength in the converter 1, all as explained in detail in my aforementioned application.

The resistor 8 is under the control of a load-current-energized, motor element 16 comprising a load solenoid operating in opposition to a spring 17. The adjustment is such that, at full-load current, the proper current flows in the winding 5 for unity-power-factor operation. Upon diminishing the load current, the core member of the element 16 is drawn downwardly and the effective value of the resistor 8 is decreased, whereby the excitation of the winding 5 is increased, and the converter 1 operates to improve the power-factor of the supply system in a well-known manner. It is desirable, at times, to entirely de-energize the motor 15 and to maintain the converter 1 in operation, as when making a short station stop. To this end, disconnecting switches 20, 21 and 22 are provided in the motor-supply leads and are suitably interlocked, either mechanically or electrically, with a switch 23 adapted to interconnect the mid-points of the windings 13 and 14, whereby the converter is maintained in operation. Under these conditions, the effective value of the resistor 8 is still further decreased, whereby the converter 1 exhibits a greater power-factor corrective effect.

While I have shown and described my invention in its preferred form, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a phase-converter of the synchronous type, of means associated therewith for reversing the phase-sequence of the output electromotive forces and for supplying said electromotive forces to a load-circuit, and unidirectional exciting means for said converter arranged to over-excite the field thereof during light-load operation.

2. In combination with a phase-converter of the synchronous type, supply and load circuits, means associated therewith for reversing the phase sequence of the output electromotive forces and for supplying said electromotive forces to said load circuit, unidirectional exciting means for said converter, means for over-exciting the field of said converter during light-load operation, and means for disconnecting said converter from said load circuit and, at the same time, for causing a maximum over-excitation of said converter.

3. In combination with a supply transformer, a phase-converter of the synchronous dynamo-electric type and a load-circuit, certain phases of said converter being arranged to be connected to said load-circuit through portions of the secondary winding of said transformer, respectively, whereby a reversal of the phase-sequence of the output electromotive forces of said converter is effected, means for disconnecting said converter from said load circuit and, at the same time, interconnecting points in the different portions of the secondary winding of said transformer, whereby said converter is maintained in operation, and means for over-exciting the secondary member of the converter during said disconnected operation.

4. The method of operating a synchronous phase-converter operatively associated with a supply transformer and having a plurality of its phases connected to a load circuit through portions of the secondary winding of said transformer in such manner as to reverse the phase-sequence of the output electromotive forces thereof, which comprises over-exciting the secondary member of said converter during light-load operation whereby leading currents may be supplied to said supply transformer at the expense of balance in said system.

5. The combination with a supply transformer, of a phase-converter of the synchronous dynamo-electric type connected thereto, a load circuit connected to derive energy from said converter through said transformer in such manner that the phase-sequence of the output electromotive forces of said converter is reversed, and means for automatically adjusting the excitation of the secondary member of said converter to obtain substantially unity power-factor therein during full-load operation, whereby substantially balanced electromotive forces are supplied to said load circuit, said means being further operative at light loads to over-excite said secondary member, whereby leading currents are supplied from said converter to said transformer for power-factor correction at the expense of the balance in said system.

6. The method of operating an alternating-current system comprising a supply transformer, a phase-converter of the synchronous dynamo-electric type and a load-circuit, certain phases of said converter being arranged to be connected to said load-circuit through portions of the secondary winding of said transformer, respectively, whereby a reversal of the phase-sequence of the output electromotive forces of said converter is effected, which comprises disconnecting said converter from said load circuit and interconnecting points in the different portions of the secondary winding of said trasformer, whereby said converter is maintained in operation, and over-exciting the secondary member of said converter, whereby leading currents are supplied to said transformer.

7. In combination, a single-phase translating device having at least two portions, a polyphase translating device of the same frequency, a series balancer machine comprising a polyphase stator winding, a rotor member rotating at synchronous speed in such direction as to generate, in said stator winding, electromotive forces of said frequency but having a phase-sequence opposite to that of said polyphase translating device, a damper winding on said rotor member, a unidirectional exciting winding on said rotor member, connections serially including said series balancer for interconnecting said translating devices for interchange of power, means for normally exciting said exciting winding for unity power-factor operation and means operable during light-load conditions for over-exciting said series balancer.

8. In combination, a single-phase translating device having at least two portions, a polyphase translating device of the same frequency, a series balancer machine comprising a polyphase stator winding, a rotor member rotating at synchronous speed in such direction as to generate, in said stator winding, electromotive forces of said frequency but having a phase-sequence opposite to that of said polyphase translating device, a damper winding on said rotor member, a unidirectional exciting winding on said rotor member, connections serially including said series balancer for interconnecting said translating devices for interchange of power, and means responsive to the load currents for variably exciting said exciting winding.

9. In combination, a translating device requiring an unbalanced single-phase energy component and having at least two portions, a polyphase translating device of the same frequency, a series balancer machine comprising a polyphase stator winding, a rotor member rotating at synchronous speed in such direction as to generate, in said stator winding, electromotive forces of said frequency but having a phase-sequence opposite to that of said polyphase translating device, a damper winding on said rotor member, a unidirectional exciting winding on said rotor member, connections serially including said series balancer for interconnecting said translating devices for interchange of power, means for normally exciting said exciting winding for unity power-factor operation and means operable during light-load conditions for over-exciting said series balancer.

10. In combination, a translating device requiring an unbalanced single-phase energy component and having at least two portions, a polyphase translating device of the same frequency, a series balancer machine comprising a polyphase stator winding, a rotor member rotating at synchronous speed in such direction as to generate, in said stator winding, electromotive forces of said frequency but having a phase-sequence opposite to that of said polyphase translating device, a damper winding on said rotor member, a unidirectional exciting winding on said rotor member, connections serially including said series balancer for interconnecting said translating devices for interchange of power, and means responsive to the load currents for variably exciting said exciting winding.

11. The method of operating a railway vehicle of the type having one or more polyphase propulsion motors, a single-phase transformer means for supplying two single-phase components of power, a polyphase feeder line connected to said propulsion motor or motors, a series balancer machine comprising a polyphase stator winding, a rotor member rotating at synchronous speed in such direction as to generate, in said stator winding, electromotive forces having a phase-sequence opposite to that of said polyphase feeder line, a damper winding on said rotor member, a unidirectional exciting winding on said rotor member, connections serially including said series balancer for interconnecting said transformer means and said polyphase feeder line for interchange of power, and means for variably exciting said exciting winding, said method consisting in normally exciting said series balancer for unity power-factor operation and overexciting said series balancer during light-load conditions.

12. The method of operating a synchronous series phase-converter which comprises increasing the unidirectional field excitation thereof upon a load decrease and vice versa.

13. The method of utilizing a series balancer machine in connection with a variable load which consists in, at times, operating said machine as a series balancer in series with the load, and at other times operating said machine as an over-excited synchronous condenser connected across the supply line.

14. The combination with a supply line, of a variable polyphase translating device, a polyphase dynamo-electric machine having damper windings and unidirectional exciting windings, means operable in accordance with load changes for variably exciting said exciting windings, switching means for serially including said machine as a series balancer in series between said translating device and said supply line, and other switching means for connecting said machine alone in shunt relation across said supply line.

In testimony whereof, I have hereunto subscribed my name this 28th day of Feb. 1918.

LEWIS WARRINGTON CHUBB.